(12) United States Patent
Adey et al.

(10) Patent No.: US 8,920,810 B2
(45) Date of Patent: Dec. 30, 2014

(54) ALGAL HARVESTING SYSTEM

(75) Inventors: Erik T. Adey, Clear, AK (US); Walter H. Adey, Reedville, VA (US)

(73) Assignee: HydroMentia, Inc., Ocala, FL (US)

( * ) Notice: Subject to any disclaimer, the term of this patent is extended or adjusted under 35 U.S.C. 154(b) by 349 days.

(21) Appl. No.: 12/956,520

(22) Filed: Nov. 30, 2010

(65) Prior Publication Data

US 2011/0154792 A1 Jun. 30, 2011

Related U.S. Application Data

(60) Provisional application No. 61/265,072, filed on Nov. 30, 2009, provisional application No. 61/265,064, filed on Nov. 30, 2009.

(51) Int. Cl.
- *A01D 44/00* (2006.01)
- *A01D 46/00* (2006.01)
- *C02F 3/32* (2006.01)
- *A01G 7/00* (2006.01)
- *A01H 13/00* (2006.01)

(52) U.S. Cl.
CPC ....................................... *A01D 44/00* (2013.01)
USPC ............. 424/195.17; 56/9; 56/13.1; 210/602; 47/1.4

(58) Field of Classification Search
None
See application file for complete search history.

(56) References Cited

U.S. PATENT DOCUMENTS

| | | | |
|---|---|---|---|
| 4,333,263 A | 6/1982 | Adey | |
| 4,966,096 A | 10/1990 | Adey | |
| 5,097,795 A | 3/1992 | Adey | |
| 5,715,774 A | 2/1998 | Adey et al. | |
| 5,846,423 A * | 12/1998 | Jensen | 210/602 |
| 5,851,398 A | 12/1998 | Adey | |
| 7,638,054 B1 * | 12/2009 | Jensen et al. | 210/602 |

OTHER PUBLICATIONS

Websited entitled: "Algae Industry Magazine. Hot Products. AVS M-50 Harvester." (Available at www.algaeindustrymagazine.com/avs-m-50-harvester/). Dowloaded from website: Jan. 5, 2012.*

* cited by examiner

*Primary Examiner* — Chris R Tate
*Assistant Examiner* — Russell Fiebig
(74) *Attorney, Agent, or Firm* — John Wilson Jones; Jones & Smith, LLP

(57) ABSTRACT

A method and apparatus for harvesting algal growth on an algal growth medium that is arranged within a floway containing water. A cable coupled to the algal growth medium is pulled by a pulling unit to draw the algal growth medium along the floway and past a vacuum positioned adjacent the algal growth medium. Suction from the vacuum is used to remove or harvest the algal growth on the algal growth medium.

2 Claims, 6 Drawing Sheets

ALGAL HARVESTING SYSTEM

CROSS-REFERENCE TO RELATED APPLICATIONS

This application claims the benefit of U.S. provisional application 61/265,072, filed on Nov. 30, 2009, and U.S. provisional application 61/265,064, filed on Nov. 30, 2009, the subject matter of which are incorporated herein by reference in their entireties.

BACKGROUND

The following described method and apparatus relates to the algal production technology which was conceived and developed over a period of about 30 years and patented as U.S. Pat. No. 4,333,263, issued Jun. 8, 1982; U.S. Pat. No. 4,966,096, issued Oct. 30, 1990; U.S. Pat. No. 5,097,795, issued Mar. 24, 1992; U.S. Pat. No. 5,851,398, issued Dec. 22, 1998; and U.S. Pat. No. 5,715,774, issued Feb. 10, 1998, the disclosures of which are incorporated herein by reference in their entireties. This apparatus is presented to satisfy a need for efficient harvest and retention of algal biomass produced on algal production systems.

Existing large-scale algal production systems marketed under the brand Algal Turf Scrubber®, or ATS systems, include in-ground troughs or "floways" in which algae is grown. These systems utilize a base of compacted soil, lined with impermeable geomembrane sheets.

Normal operation of an algal production system requires regular removal or "harvesting" of the algae, which has historically been done by scraping or vacuuming. In one process, harvesting is conducted by a tractor-type vehicle pushing a plow, and removed algal biomass is transported by water flow down the floway to a collection system comprising a chain-operated rake, filter, and containment in a sump pond for the finer material. Additional treatment can include secondary fine filtration with 10 micron mesh, but this is expensive at large scale. The coarser algae is piled onto a concrete pad for composting after removal from the water flow. The finer algae, mostly diatoms, in the sump ponds can be occasionally harvested as a fertilizer product.

Another method of harvest includes a mobile reel mechanism onto which the algal growth screen is wound. Algal biomass is scraped off the screen. The scraping operation is inefficient in terms of algal biomass recovery, and has been applied to in-ground algal production systems only. Significant damaged algal material remains on the screen to be washed away upon return to the floway, or dropped to the ground on reel-up.

Another method of harvest uses a vacuum harvest system that includes a vacuum suction unit, a generator, and container riding on a heavy cart. The cart runs on concrete side rails along an in-ground algal production system, while the vacuum suction is used to vacuum up the algae. This system requires more concrete work than the regular in-ground algal production system. Many smaller test ATS units have been harvested with portable hand-held vacuums, but this method is labor-intensive and not economical for large scale operations.

Historically, the removed algal biomass has been assigned a low economic value and has been discarded, or rendered into fertilizer or fish or other animal food. Due to the economic benefit of utilizing the algal biomass to offset costs of operation, future harvests from ATS, and other algal production systems may be retained for further processing into valuable product. These historic applications of ATS have been primarily aimed at water purification, but new uses for algal biomass such as for biofuels or pharmaceuticals require more efficient harvest and retention of algae in suitable quantity and quality for the specific purposes. In particular, effective harvesting of algal biomass requires maintaining a certain amount of moisture content in the biomass, but excess water may be detrimental to processing, necessitating a mechanism of removal whereby the moisture level is controllable.

SUMMARY

The method and apparatus described herein provide for harvesting algal growth on an algal growth medium. The algal growth medium is typically arranged within a floway containing water. In one aspect, the apparatus includes a cable coupled to the algal growth medium that is pulled by a pulling unit to draw the algal growth medium out of the floway. The pulling unit pulls the algal growth medium past a vacuum positioned adjacent the algal growth medium. Suction from the vacuum is used to remove or harvest the algal growth on the algal growth medium.

In another aspect, the algal harvesting system includes a floway having a first end and a second end and rollers at the first and second ends. A belt within the floway extends from the first end to the second end of the floway and has an algal growth medium on its surface. A return belt is also within the floway and resides beneath the belt. The return belt extends from the first end to the second end of the floway and passes around the rollers to connect to the belt at the first and second ends of the floway. The algal growth medium may itself be the upper belt, provided it is designed with sufficient strength.

The system may also include a drawing cable within the floway coupled to the return belt. The drawing cable extends from the first end to the second end of the floway, passes around a pulley, and returns to the first end. A return cable is also coupled to the return belt. The return cable has sufficient length to extend at least from the first end to the second end of the floway. A vacuum at the first end of the floway is arranged adjacent to the belt to remove algal growth on the algal growth medium. A cable winder is also at the first end of the floway. The cable winder is coupled to the drawing cable and the return cable. In operation, the cable winder draws the drawing cable thereby drawing the algal growth medium past the vacuum to allow algal growth on the entire algal growth medium to be removed.

In another aspect, the algal harvesting system includes a floway having a first and second ends. The system further includes a cable extending from the first end to the second end that passes around a pulley and returns to the first end. An algal growth medium also resides within the floway and is coupled to the cable. An adjustable reel is positioned adjacent to the first end of the floway and coupled to the cable. An adjustable vacuum is positioned between the first end of the floway and the reel. The vacuum is able to remove algal growth from the algal growth medium. Additionally, an adjustable cable winder is positioned between the first end of the floway and the reel. The cable winder is also coupled to the cable. In operation, the reel rotates, thereby drawing the algal growth medium toward the reel and past the vacuum. The vacuum removes an portion of algal growth from the algal growth medium and the algal growth medium with retained algal bases is wrapped around the reel. The cable winder pulls the algal growth medium back onto the floway after the harvest is finished.

A method of harvesting algal growth includes various steps. The method includes positioning a vacuum adjacent an algal growth medium within water. The algal growth medium is then drawn out of the water past the vacuum and the algal growth is removed from the algal growth medium using the vacuum.

Another method of harvesting algal growth includes positioning a vacuum above an algal growth medium in a tray. A cable is attached to the algal growth medium and is wound in a first direction, drawing the algal growth medium past the vacuum. The algal growth is removed from the algal growth medium using the vacuum. The algal growth medium is then passed around a roller in the first direction. A first portion of the algal growth medium that has passed the vacuum is passed beneath a second portion of the algal growth medium that has not passed the vacuum. A return cable attached to the algal growth medium is wound in a second direction. The algal growth medium passes around the roller in the second direction.

Another method of harvesting algal growth includes positioning a reel next to a tray and positioning a vacuum between the reel and the tray. Further, a cable winder is positioned between the reel and the tray. A first end of a cable coupled to an algal growth medium within a tray is coupled to the cable winder. A second end of the cable is coupled to a reel. The reel is rotated in a first direction. The rotation of the reel draws the cable and the algal growth medium past the vacuum toward the reel. The algal growth is removed from the algal growth medium using the vacuum. The algal growth medium is then wrapped around the reel. The cable is wound in the first direction using the cable winder. Winding the cable rotates the reel in a second direction and draws the growth medium off the reel toward the tray.

DETAILED DESCRIPTION OF PREFERRED EMBODIMENTS

Figure 1:
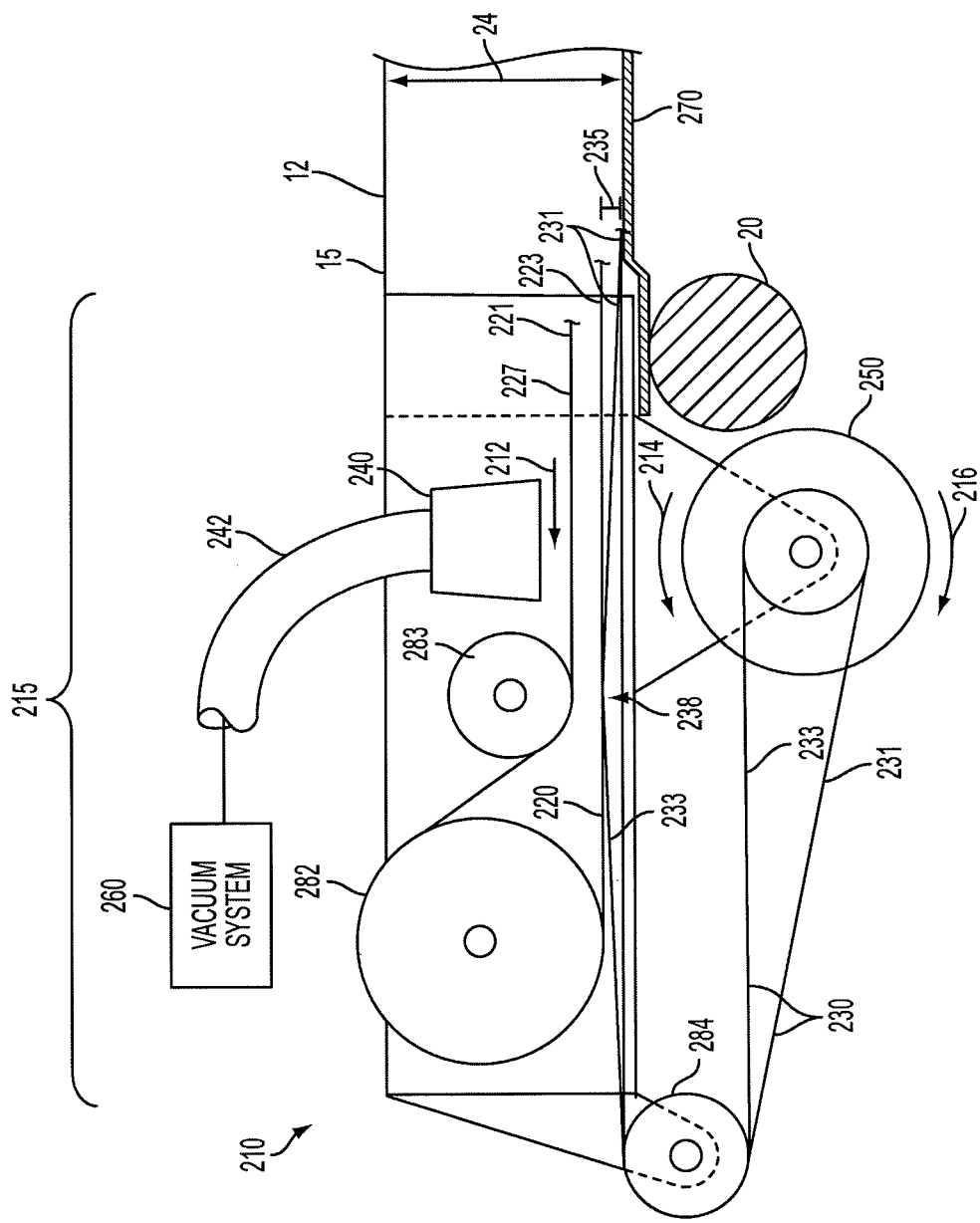
FIG. 1 is a cross-sectional side view of an upper unit of an algal removal system according to a preferred embodiment.
Figure 2:
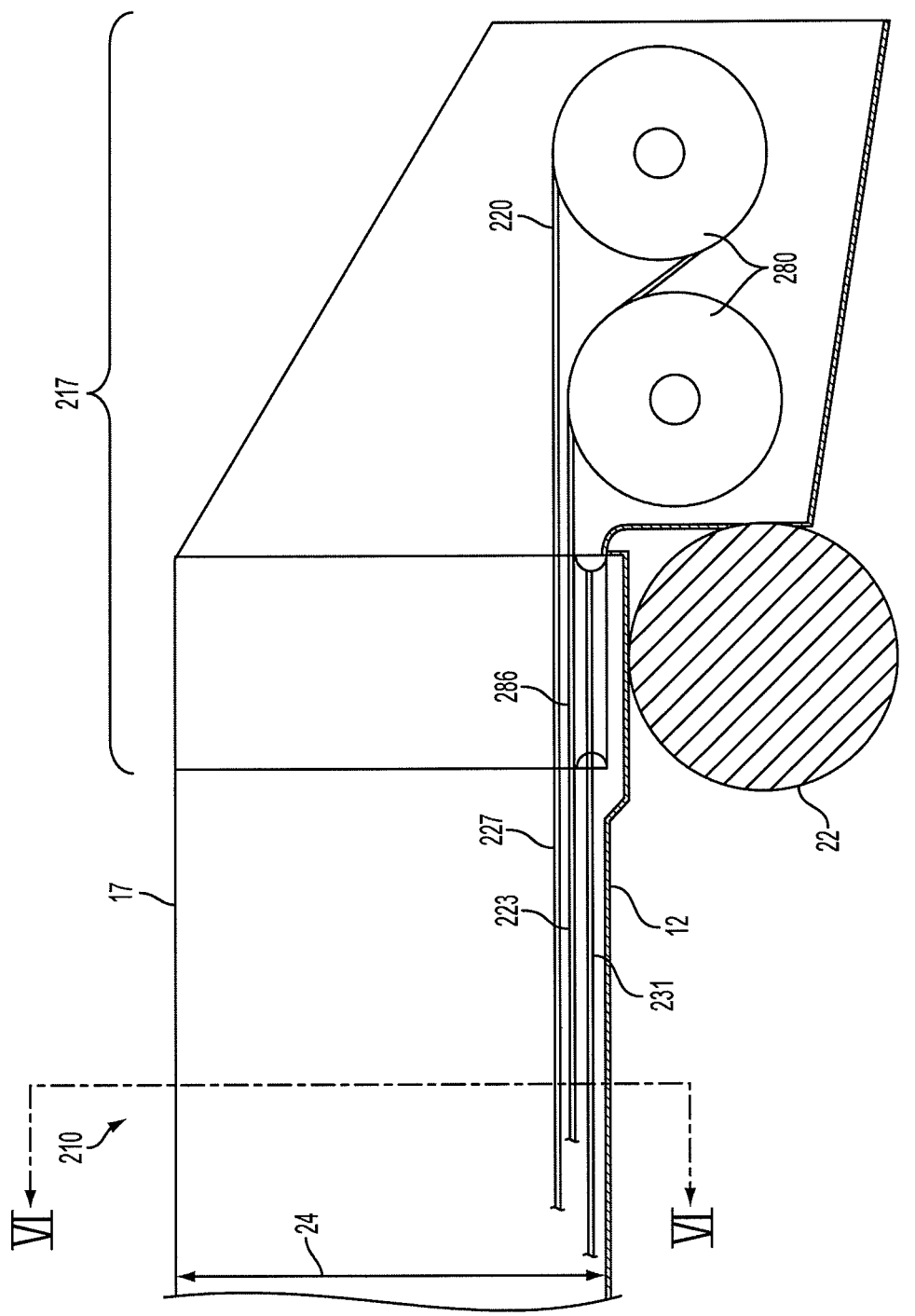
FIG. 2 is a cross-sectional side view of a lower unit of the algal removal system of FIG. 1.

A belt-medium vacuum harvester system 210 for algal production systems, such as an ATATS system, is described herein. As shown in FIGS. 1 and 2, the harvester system 210 may be used to harvest algae from an algal production system that produces algae in floways 12 using an algal growth medium 227 arranged in the floways 12. Water is provided in the floways 12 to allow algal growth on the algal growth medium 227. In the embodiment shown in FIGS. 1 and 2, the floway 12 is supported by a cross member 20 at an upper end 15 of the floway and a cross member 22 at a lower end 17 of the floway. Other cross members and/or other supports may be used as needed. An exemplary algal production system is described in U.S. patent application Ser. No. 12/950,212, which is incorporated by reference herein in its entirety.

FIGS. 1 and 2 show the harvester system 210 arranged within a floway 12. The harvester system 210 includes an upper unit 215 located at the upper end 15 of the floway 12 (FIG. 1) and a lower unit 217 located at a lower end 17 of the floway 12 (FIG. 2). The upper unit 215 includes a vacuum head 240 positioned above a growth medium 227. The vacuum head 240 is coupled to a vacuum system 260. The upper unit 215 also includes a cable winder 250, pulleys 284, a topmost roller 282, and a vacuum positioning roller 283. The lower unit 217 includes a pulley 286 and rollers 280.

The harvester system 210 further includes a continuous belt 220 of material running the length of the floway 12 between the upper unit 215 and the lower unit 217. The belt 220 includes a return belt 223 portion and an upper portion 221. At the lower unit 217, the return belt 223 portion of the belt 220 passes around rollers 280 and runs back toward the upper unit 215 of the system 210. The return belt 223 portion of the belt 220 is arranged beneath the upper portion 221 within the floway 12. At the upper unit 215, the return belt 223 passes around a topmost roller 282 and connects with the upper portion 221 so that the belt 220 is continuous. The belt 220 forms a structure similar to a conveyor belt.

The belt 220 supports the algal growth medium 227 on its upper portion 221. The upper portion 221 of the belt 220 supporting the algal growth medium 227 is normally located on the top of the return belt 223 to allow for algal production. The return belt 223 portion of belt 220 is normally located beneath the upper portion 221 of the belt 220 supporting the algal production medium 227 and is not necessarily designed for algal production on its surface. Accordingly, the return belt 223 may be made of suitable material that is not a growth medium. In various embodiments, the upper portion 221 and/or the return belt 223 may include thereon the growth medium 227 or be formed of the algal growth medium 227, provided the algal growth medium 227 is designed with sufficient strength.

Figure 3:
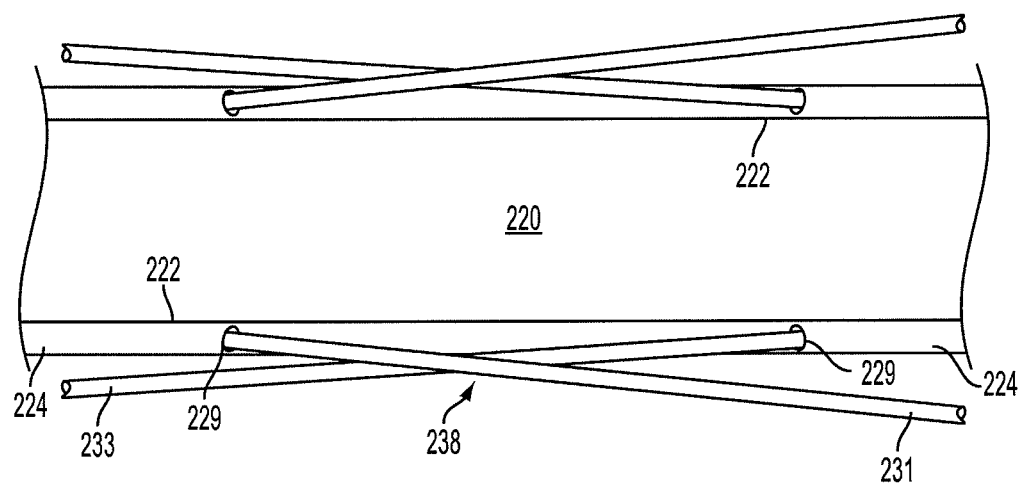
FIG. 3 is a top view of a belt for use in the algal removal system of FIG. 1.

FIG. 3 is a top view of the belt 220. As shown in FIG. 3, cables 230, which may be stainless wire cables or low-stretch synthetic rope, are attached along the sides 222 of the belt 220. In one embodiment, the cables 230 may be sewn into fabric sleeves 224 attached to the sides of the belt 220. The cables 230 extend through and protrude from the sleeves 224 at point 238 along the belt 220, to act as pulling lines for the belt 230. With the cables attached along the sides 222 of the belt 220, the strain of pulling on the cables 230 is distributed along the entire length of both sides of the belt 220. The materials for the cables 230 and sleeves 224 are selected and the cables 230 and sleeves 224 are constructed to provide sufficient friction to move the belt 220 without unacceptable slippage between the sleeves 224 and the cables 230. Each cable 230 is continuously around the belt 220 up to the point where they exit the ends 229 of the sleeves 224. In other embodiments the return belt 223 of the belt 220 may instead consist of only of cables 230 attached to both ends of the upper portion of the belt such that while continuous, the return belt 223 does not have a substantial center area.

The cables 230 are coupled to a pulling unit 250, for example, a cable winder winch, located at the upper unit 215 of the floway 12. There is sufficient length on each end of the cables 230 extending out of the sleeves 224 so that the cables 230 may be extended to the pulling unit 250. Additional extra length on each cable 230 is also provided to allow the full travel of the algal growth medium 227 under the vacuum 240 for removal of algal growth.

Figure 6:
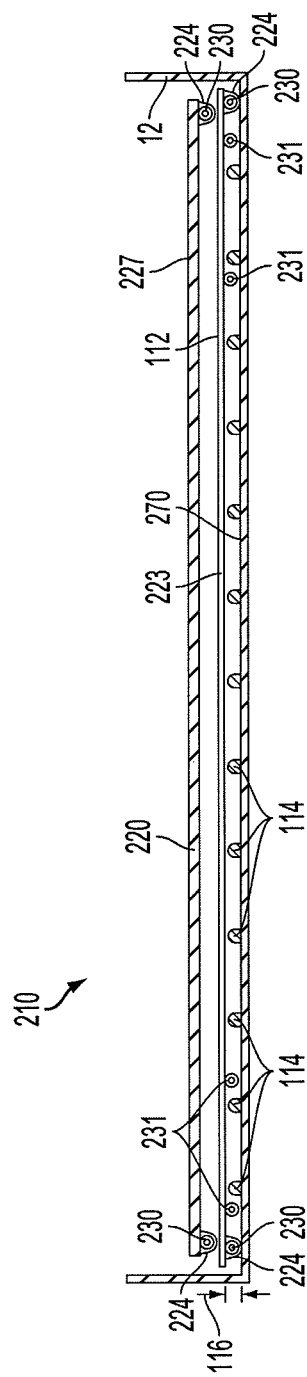
FIG. 6 is a view taken along section line VI-VI of FIG. 2.

While algae is growing on the algal growth medium 227, the belt 220 is positioned so that the point 238 where the drawing cables 231 exit the sleeves 224 of the belt 220 is near the upper end 15 of the floway 12. The drawing cables 231 extend from the upper end 15 to the lower end 17 of the floway 12 and around a horizontal pulley (or pulleys) 286 at the lower end 17 of the floway 12. The drawing cables 231 then extends back to the upper end 15 of the floway and is coupled to the cable winder 250 as previously described. The drawing cables 231 are placed within the floway 12 and beneath the return belt 223 such that it will not interfere with the movement of the return belt 223. The return cables 233 exit the sleeves 224, as shown in FIG. 3, extend around the pulleys 284, and couple to the cable winder 250, as shown in FIG. 1. As shown in FIG. 6, ridges 114 extent longitudinally in the floway 12. The ridges 114 support the belt 220 above the pulley 286, and allow the free travel of the drawing cable 231 and return cable 233 within the bottom of the floway 12 under the belt 220.

Alternatively, the cables 230 may be attached at points on the belt 220, rather than being located in the sleeves 224, or may be attached within the sleeves 224. Other embodiments could include other numbers of cables, such as: three cables with a center cable positioned between the two edge cables; one cable positioned to run longitudinally near the center of the belt 220; or other numbers of cables. In another embodiment, the cable may be continuous, rather than having ends which are wound and unwound.

In another embodiment, the belt 220 could be driven with rollers such as on a conveyor belt, but the algae may cause excessive slip. High tension could be applied to the belt 220 to increase friction on the rollers, but this may require a heavier and more expensive belt, with other issues related to growth and harvest. A roller chain could be installed along the sides to run on cogs on the drive rollers, but the cost may be relatively high.

Algal growth removal is accomplished through suction by the vacuum head 240 at the upper unit 215. The vacuum head 240 is positioned over the belt 220 in such a way that the growth medium 227 will be drawn past it as the cable winder 250 winds up the free ends of the cables 230. The vacuum head's 240 position, relative to the growth medium 227, is adjusted using the vacuum positioning roller 283 such that the position of the head 240 is adjustable to suit harvest rates and biological or environmental conditions. The vacuum head 240 is plumbed into a vacuum system 260, including vacuum piping running to one side of the algal production system, at which point it will be connected by a flexible hose 242 to a pumper truck, or piped to an on-site processing unit. Flexible hose 242 will connect the vacuum head to the vacuum system 260 network of suction plumbing.

The rollers 280 at the lower end 17 of the floway 12 shown in FIG. 2 and topmost roller 282 at the upper end 15 of the floway 12 shown in FIG. 1 are positioned so that the belt 220 maintains a minimal clearance height 235 above the floway surface 270, sufficient to allow the growth medium to run inverted beneath itself as harvest proceeds. The topmost roller 282 may have a larger diameter than rollers 280, to reduce deformative strains to the algal growth medium 227 as it passes over. The ridges 114, as shown in FIG. 6, have a height 116 of approximately one half inch and may run longitudinally along the surface 270 of the floway 12 to support the growth medium 227 away from the floway surface 270, and to minimize friction.

During removal of algal growth from the algal growth medium 227, the cable winder 250 installed on the upper end 15 of the floway 12 takes up, pulls, or draws the ends of the cables 230 that extend out from the belt 220 at point 238 as shown in FIG. 3. The cables 230 pass over pulleys 284 (one pulley for each drawing cable 231 and each return cable 233) and enter the cable winder 250 such that the drawing cable 231 rounds the winder 250 in the opposite direction to the return cables 233, providing forward and reverse capability with a single winder. In the illustrated embodiment, there is one cable 230 for each of the two belt edges 222, resulting in two drawing cables 231 and two return cables 233, and thus requiring four pulleys 284. Should one winder be insufficient, a second winder may be installed.

The process of harvesting, i.e. removal, of algal growth proceeds with the application of suction by the vacuum system 260 and the operation of the cable winder 250 to draw the belt 220 with the growth medium 227 up the floway 12 and under the vacuum head 240 in the direction of an arrow 212. During harvesting, not all the algal growth is removed. A portion or base of the algal growth remains on the algal growth medium 227 to allow for a continued growth of the algae. In one embodiment, the growth medium 227 may be drawn out of the tray to be vacuumed. In another embodiment, the vacuuming may occur within the tray. Generally, the water supply to the floway is shut off for some time before harvest to allow drainage and minimize the amount of water drawn into the vacuum system. The algal growth medium and/or the belt should be chosen to allow for water drainage. The timing of the water shutoff and the harvest is selected to avoid drying, sunburning or freezing damage to the algal bases remaining on the growth medium such that they will continue to grow when the water is turned on after harvest. These adjustments will be made to provide most efficient algal biomass removal with appropriate amount of retained water, while leaving sufficient algal bases attached to the growth medium to allow rapid re-growth upon return to the floway and reapplication of water flow.

The harvested area of the growth medium 227 on the belt 220 passes around the topmost roller 282 and travels past the unharvested area of the belt 220 as the harvest progresses, until the upper portion 221 of the belt 220 with the algal growth medium 227 has passed the vacuum or the upper portion 221 of the belt 220 lies completely underneath the return belt 223.

During harvesting, the cable winder 250 rotates in the direction of an arrow 214. The topmost roller 282 also rotates in the direction of arrow 214. As cable winder 250 rotates in the direction of the arrow 214, it winds the drawing cable 231 and unwinds return cable 233. As harvesting proceeds, the point 238 on the belt 220 where cables 230 exit the belt 220 is drawn from the upper end 15 to the lower end 17 of the floway 12. As a result, the return cable 233 is pulled toward the lower end 17 of the floway 12.

Once harvesting is complete, an operator reverses the cable winder 250 so that the cable winder 250 rotates in the direction of an arrow 216. As cable winder 250 rotates in the direction of the arrow 216, it winds the return cables 233 and unwinds the drawing cables 231. As a result, the upper portion 221 of the belt 220 with the algal growth medium 227 on its upper surface passes around the topmost roller 282 in the direction of the arrow 216. This again places the upper portion 221 of the belt 220 with the algal growth medium 227 on top of the return belt 223 and the portion of the belt 220 shown in FIG. 3 at the upper end 15 of the floway 12. This process would be done with each unit of the algal production system as required by the harvest schedule.

One advantage of the system 210 over other methods is that it is entirely contained within the floway 12 along its length, so as to prevent water loss, and it is amenable to automation.

Figure 4:
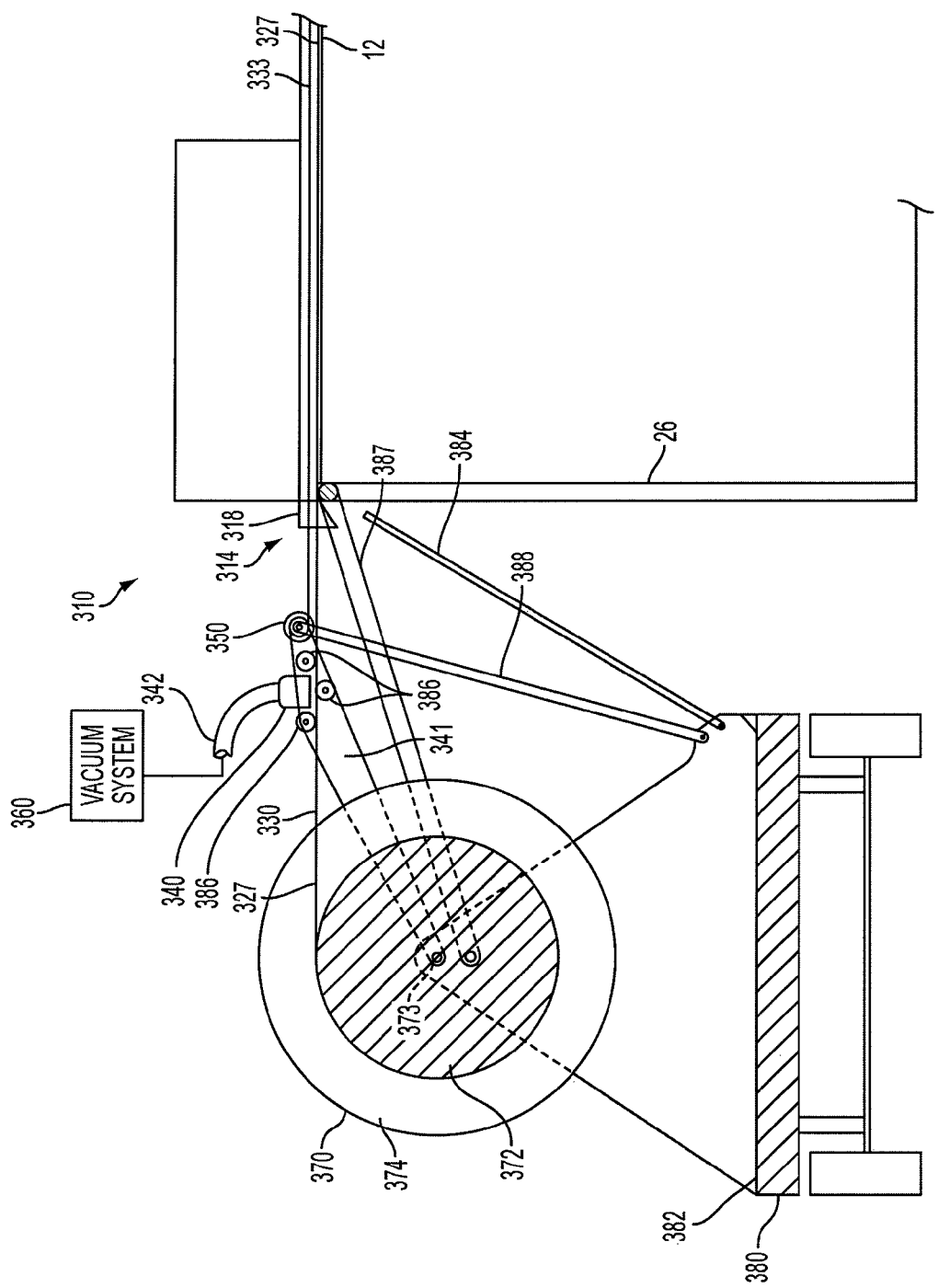
FIG. 4 is a cross-sectional side view of a mobile portion of an algal removal system according to another preferred embodiment.

FIG. 4 shows a mobile reel vacuum harvester system 310 according to another embodiment that may be used with the algal production systems, including in-ground algal production systems and including an ATATS system. The system 310 includes a vacuum unit 360 and a reel winder or pulling unit 370 mounted together on a truck or trailer 380, or on separate vehicles. The vacuum unit 360 includes a vacuum head 340 connected to a vacuum pump and container such as a septic pumper. In one embodiment, the reel winder 370 includes a hydraulic net reel type winch four feet wide with a drum 372 diameter of four feet and a total diameter with guards 374 of six feet, with adaptations to suit a particular application. A power source for the net reel 370 includes a generator with a hydraulic pump mounted on the truck or trailer 380, but may be an integral power takeoff on the tractor or truck. System 310 further includes a pulling unit 350.

Figure 5:
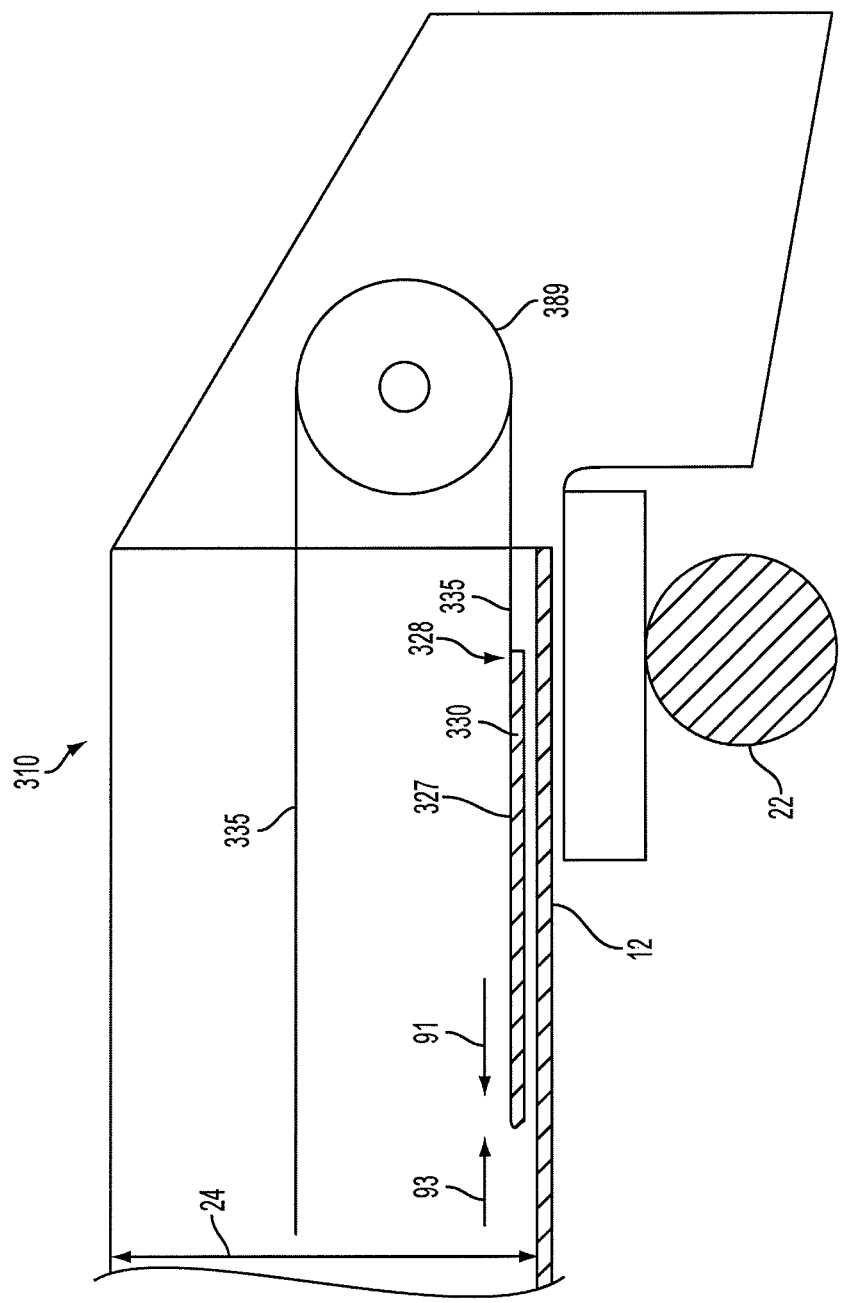
FIG. 5 is a cross-sectional side view of a fixed portion of the algal removal system of FIG. 4 coupled to the tray.

In this embodiment, as shown in FIGS. 4 and 5, to accommodate the use of the system 310, a growth medium 327 within a floway 12 has a cable 330, such as a wire cable or low-stretch synthetic fiber rope, stitched into each side to permit pulling the growth medium 327 out of the floway 12 onto the reel 370, with sufficient additional cable 335 attached to the growth medium 327 far end 328 to run around a pulley 389 and return to the end 314 of the floway 12 from which harvesting is accomplished. The wire cable 335 is used with the pulling unit 350, for example a winch, to pull the growth medium 327 back into the floway after harvest. Eyes will be spliced into the ends of the wire cables 330, 335 such that they may be hooked to clips at the ends of wire cable pennants (not shown) on the reel 370 and pulling unit 350, allowing the harvester unit to be disconnected for transport to another floway.

In one embodiment, connections are made by hand at each of the floways 12 within the algal production system. The mobile reel harvest system 310 is moved from one floway 12 to the next on an established harvest schedule. Each floway 12 is adapted to allow the use of the system 310, to prevent water loss onto the ground, and prevent loss of algal biomass. Part of this adaptation is a flaring sluice piece 318 attached to the upper end 314 of the floway 12 to protect the edge of the floway 12, and to direct any splash and algal drop-off sufficiently far out from the floway 12 support structure 24 to be caught and retained. A splash tray 382 and adjustable sluice 384 are attached to the harvester in such a way that the adjustable sluice 384 may be maneuvered into place between the harvester and the floway, underneath the growth medium 327 as it is being wound onto the harvester, to direct any splash and dropped algae into the splash tray 382 for later removal. The sluice 384 has a length at least equal to the width of the tray 12, but no longer than the length of the truck 380.

In another embodiment, the floway 12 is at ground level or built into the ground, and the harvester is configured and maneuvered such that the growth medium 227 is drawn up from the floway 12 past the vacuum head 340. Algal growth dropping off of the medium 227 may be caught in a tray at the point of exit from the floway 12 and vacuumed up after replacement of the growth medium 227 into the floway 12.

FIG. 4 illustrates an adjustable reel positioning brace 387 attached on the side of the reel 370 near its center axle 373. The positioning brace 387 extends from the reel 370 to the floway 12, to maintain the distance between the floway 12 and the reel 370 and to prevent strain on the algal production system during harvesting. A corresponding brace is attached on the opposite side of the reel 370. Further, the height and winding speed of the reel 370 are also adjustable. A vacuum head 340 is mounted on a bracket 341 with an adjustable support 388 extending out on the side of the reel 370 closest to the floway 12. Guide rollers 386 are mounted on this bracket 341 and positioned such that they will be above and below the growth medium 327 as it is reeled onto the net reel 370. The guide rollers 386 help maintain the position of the vacuum head 340 at a suitable height above the algal growth medium 327 for algal biomass removal. A corresponding bracket is attached to a side of the reel 370 and guide rollers 386 that is opposite the bracket 341. A corresponding support extends to the corresponding bracket. As a result, the vacuum position is adjustable. Additionally, the force of the suction produced by the vacuum system 360 is adjustable.

The process of harvesting begins with alignment of the harvest vehicle 38 to the floway 12 to be harvested and extension and adjustment of the reel positioning braces 387 to meet the floway 12. The drip shield 382 and drip sluice 384 are positioned under the path of the algal growth medium 327 from the floway 12 to the reel 370. The eyes in the ends of the wire cables 330 within the sides of the growth medium 327 are attached to the reel 370, and the retrieval eyes on the extra cable 335, extending from the far end 328 of the growth medium 227 and around the pulley 389, attach to the cable winder 350. The vacuum head 340 is positioned to be above and adjacent to the growth medium 327 as it is drawn from the floway 12 to the reel 370. The vacuum head 340 is positioned using an adjustable support 388.

The clutch on the cable winder 350 is released and the reel 370 pulls cables 300 thereby pulling the growth medium 327 out of the floway 12. The reel 370 draws the growth medium 327 in the direction of arrow 91 past the vacuum head 340 and winds the growth medium 327 around itself. The reel 370 is rotated until the entire growth medium 327 has been pulled past the vacuum head 340 so that a portion of the algal growth on the growth medium 327 is removed. After the entire surface of the growth medium 327 has been harvested, the clutch on the reel 370 is released, and power is applied to the cable winder 350. The cable winder 350 pulls and winds the cable 335 to pull the growth medium 327 in the direction of arrow 93 and back into the floway 12. This process may be done with a growth medium in every tray within an algal production system as required by a harvesting schedule.

One or more vacuum systems 260 and/or 360 may be connected to a central processing facility (not shown) for processing the harvested algal biomass and/or for controlling the operation of the systems 260 and 360.

It should be apparent that many modifications and variations of the preferred embodiments as hereinbefore set forth may be made without departing from the spirit and scope of the present invention. The specific embodiments described are given by way of example only. The invention is limited only by the terms of the appended claims.

What is claimed as new and desired to be protected by Letters Patent of the United States is:

1. An algal harvesting system comprising:
   a floway having a first end and a second end;
   a first roller at the first end and a second roller at the second end;
   a belt within the floway, the belt extending from the first end to the second end;
   a return belt within the floway and beneath the belt, the return belt extending from the first end to the second end and passing around the first and second rollers to connect to the belt at the first and second ends;
   a drawing cable within the floway, the drawing cable extending from the first end to the second end, passing around a pulley and returning to the first end, the drawing cable being coupled to the return belt;
   a return cable coupled to the return belt, the return cable having sufficient length to extend at least from the first end to the second end;
   an algal growth medium on a first surface of the belt;
   a vacuum at the first end of the floway arranged adjacent to the belt, the vacuum able to remove algal growth on the algal growth medium; and
   a cable winder at the first end of the floway, the cable winder coupled to the drawing cable and the return cable, wherein, in operation, the cable winder draws the drawing cable thereby drawing the algal growth medium past the vacuum to allow algal growth on the entire algal growth medium to be removed.

2. An algal harvesting system comprising:
a floway having a first end and a second end;
a cable extending from the first end to the second end, passing around a pulley and returning to the first end;
an algal growth medium within the floway coupled to the cable;
a reel positioned adjacent to the first end of the floway and coupled to the cable, the height and winding speed of the reel being adjustable;
a vacuum positioned between the first end of the floway and the reel, the vacuum able to remove algal growth from the algal growth medium and wherein the position and the force of the suction is adjustable; and
a rotatably adjustable cable winder positioned between the first end and the reel, the cable winder coupled to the cable; wherein, in operation, the reel rotates thereby drawing the algal growth medium toward the reel and past the vacuum, the vacuum removing a portion of the algal growth from the algal growth medium, the algal growth medium, with a remaining portion of the algal growth, wrapping around the reel.

* * * * *